E. HILL.
CHICKEN SEPARATOR.
APPLICATION FILED SEPT. 30, 1908.

942,902.

Patented Dec. 14, 1909.
4 SHEETS—SHEET 1.

Witnesses

Inventor
Earl Hill.
By C. A. Snow & Co.
Attorneys

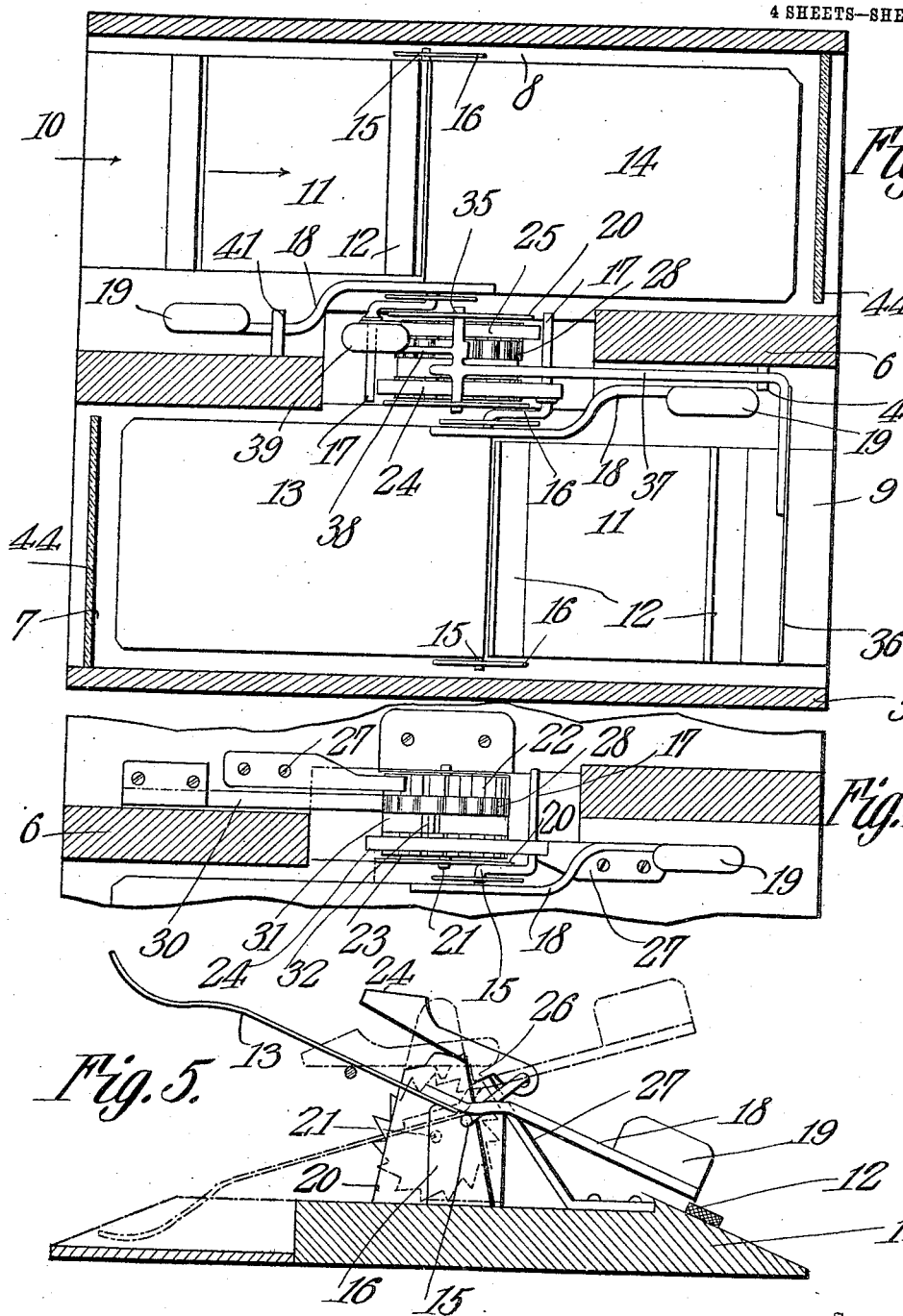

E. HILL.
CHICKEN SEPARATOR.
APPLICATION FILED SEPT. 30, 1908.

942,902.

Patented Dec. 14, 1909.
4 SHEETS—SHEET 3.

Witnesses

Inventor
Earl Hill.
By Crowd & Co.
Attorneys

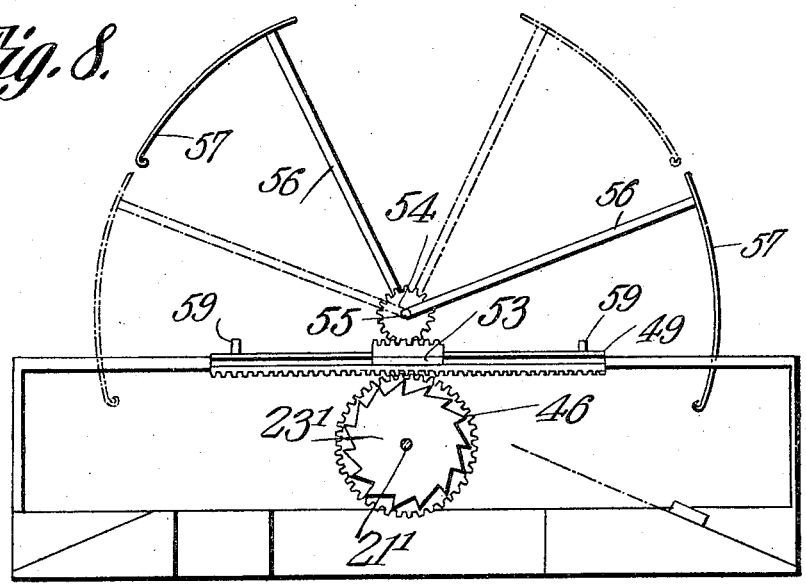
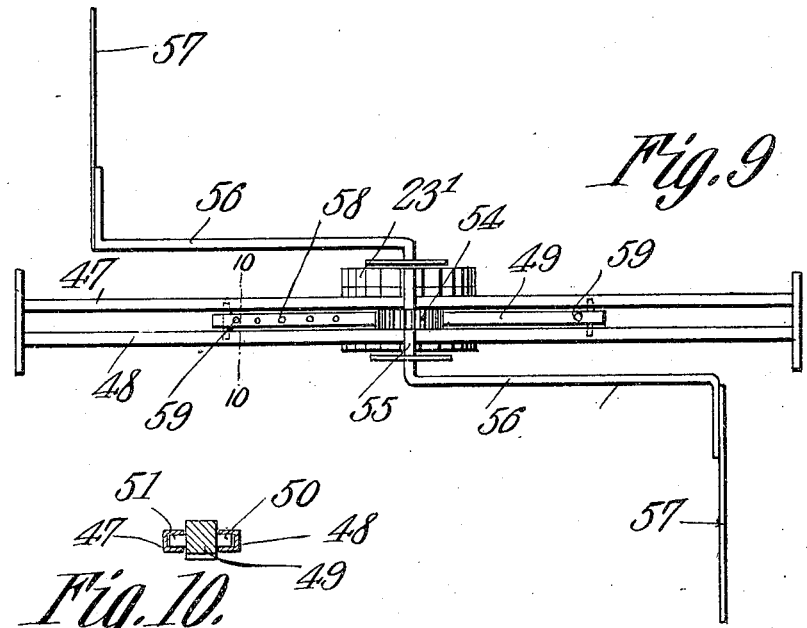

UNITED STATES PATENT OFFICE.

EARL HILL, OF AMSDEN, OHIO.

CHICKEN-SEPARATOR.

942,902.  Specification of Letters Patent.  Patented Dec. 14, 1909.

Application filed September 30, 1908. Serial No. 455,414.

*To all whom it may concern:*

Be it known that I, EARL HILL, a citizen of the United States, residing at Amsden, in the county of Seneca and State of Ohio, have invented a new and useful Chicken-Separator, of which the following is a specification.

This invention relates to stock separators and more particularly to a separator especially designed for use in connection with brooders or colony houses for preventing over-crowding of the poultry within the latter.

The object of the invention is to provide means for controlling the entrance to a chicken brooder or colony house so as to keep the poultry separated into small groups and thus avoid crowding and consequent suffocation of the chickens. It is intended, therefore, that the brooder or pen shall be divided into several compartments, each of which has an opening to a barn-yard or other inclosure and that one of the separators shall be placed at each opening so that, in case of a brooder, all the chicks must pass through the separator in going into or out of said compartment.

The separator is so constructed that when a certain number of chicks enter a compartment, the door controlling the entrance passage automatically closes and those chickens remaining outside, if any, are compelled to enter another compartment which is not filled to the limit.

The invention consists in a receptacle having an entrance passage and exit and provided with a gate or barrier operable at predetermined intervals to automatically open and close said gate.

Figure 1:
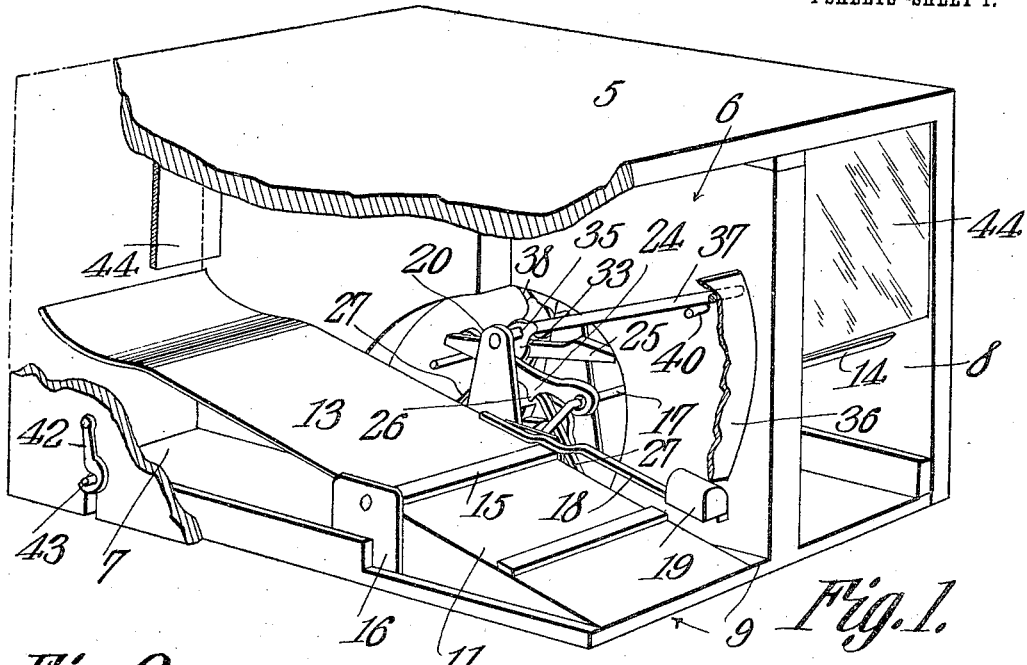
Figure 2:
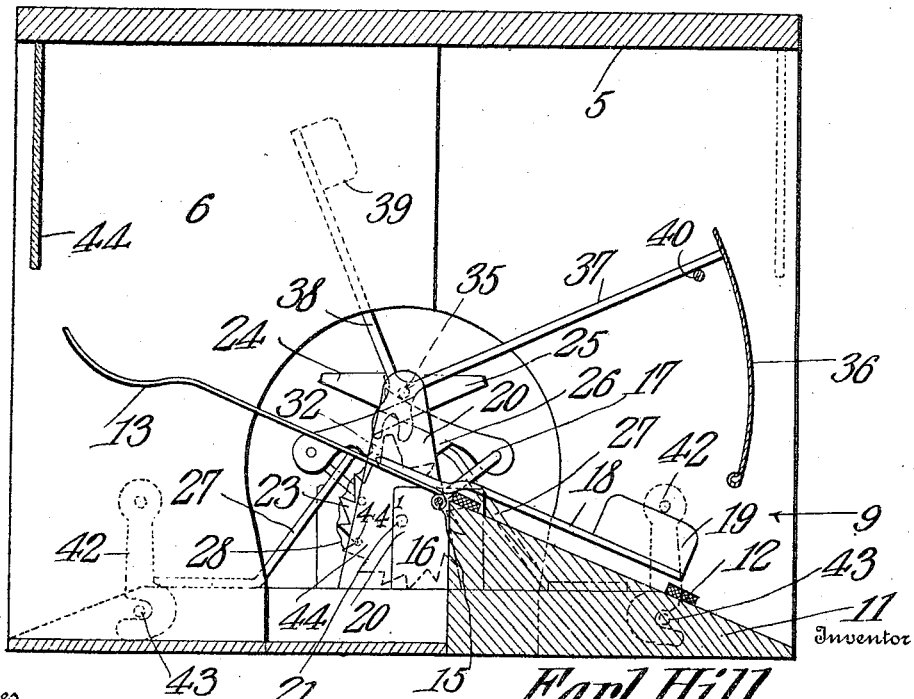
Figure 6:
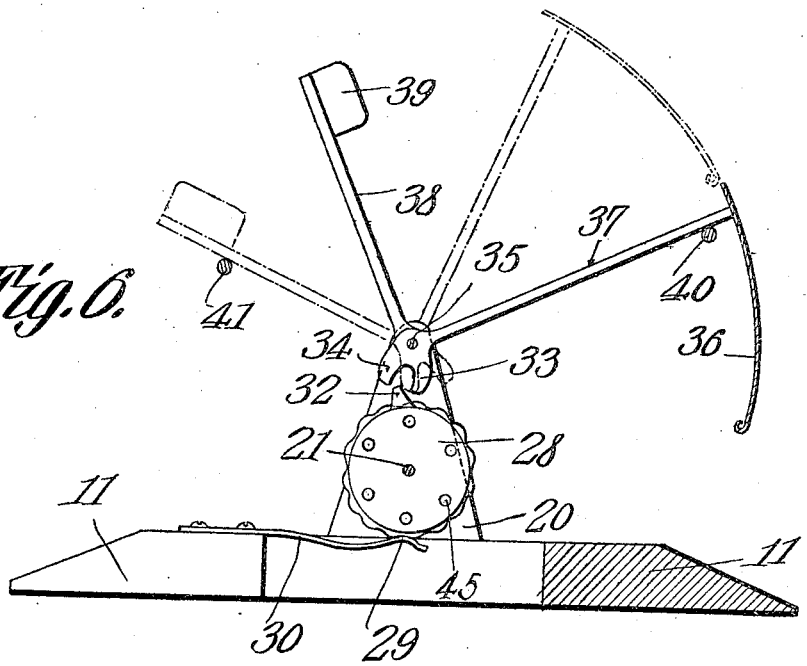
Figure 7:
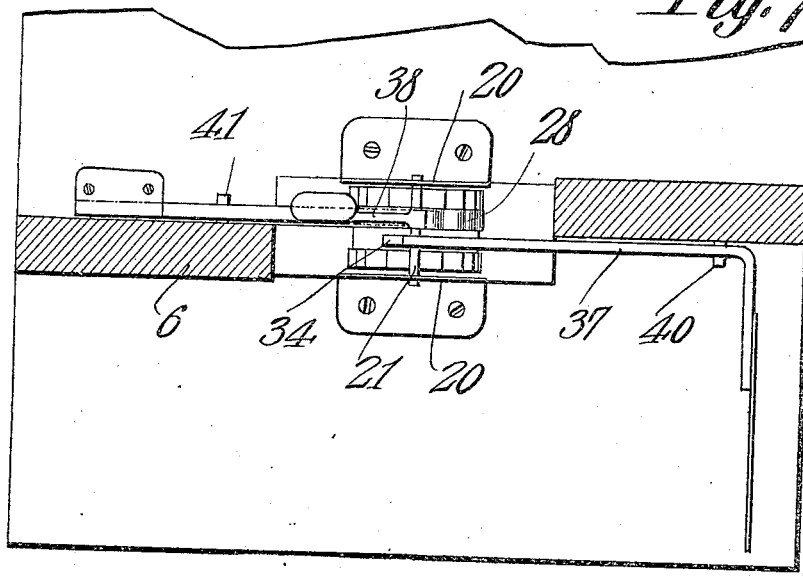

In the accompanying drawings forming a part of this specification:—Figure 1 is a perspective view of a poultry separator constructed in accordance with my invention. Fig. 2 is a longitudinal sectional view of the same. Fig. 3 is a sectional top plan view of Fig. 2. Fig. 4 is a similar view, a portion of the operating mechanism being removed in order to more clearly show the construction of the ratchet wheels. Fig. 5 is a side elevation of one of the tilting platforms and the operating mechanism therefor, the platform and actuating pawl being shown in full lines in elevated or inoperative position and in dotted lines in lowered or operative position. Fig. 6 is a similar view showing the mechanism for operating the gate or barrier. Fig. 7 is a top plan view of Fig. 6. Fig. 8 is a side elevation illustrating a modified form of the invention. Fig. 9 is a top plan view of Fig. 8. Fig. 10 is a transverse sectional view taken on the line 10—10 of Fig. 9.

Similar numerals of reference indicate corresponding parts in all of the figures of the drawings.

The improved separator forming the subject matter of the present invention comprises a casing or receptacle 5, preferably rectangular in shape, as shown, and divided by a vertical partition 6 into a plurality of compartments or passage ways 7 and 8. The passage 7 is provided with an entrance 9 leading from a barn yard or other inclosure into one of the compartments of the brooder, while the passage 8 is provided with an exit 10 through which the chickens in the brooder may pass into the barn-yard or inclosure. Disposed at the entrance 9 and exit 10 are inclined approaches 11 having transverse cleats 12 secured thereto to afford a footing for the chickens on their way to the pivoted platforms 13 and 14. The platforms 13 and 14 are rigidly secured to transverse shafts 15 journaled in spaced ears 16 disposed within and extending vertically from the base of the adjacent passage-ways, one end of each shaft 15 being extended laterally to form a terminal crank arm 17. Secured to the inner edges of the pivoted platforms are longitudinally disposed arms 18 on which are mounted suitable weights 19 which serve to normally retain said platforms in elevated position and in alinement with the upper surface of the adjacent inclined block or approach 11.

Arranged at the center of the receptacle 5 and secured in any suitable manner to the floor thereof are spaced uprights or standards 20 in which is journaled a main operating shaft 21. Keyed or otherwise rigidly secured to the shaft 21 are spaced ratchet wheels 22 and 23 having their teeth disposed in opposite directions and actuated by pawls 24 and 25 pivotally mounted on the adjacent crank arm 17, as shown. The pawls 24 and 25 are each provided with a depending spur or projection 26 adapted to engage the teeth on the adjacent ratchet wheel and rotate the latter the distance of one tooth each time the adjacent pivoted platform is depressed.

The ratchet wheels are each preferably provided with fifteen teeth so that only fifteen chickens may enter the brooder at one time. It will of course be understood, however, that the number of teeth on the ratchet wheels may be varied so that the number of chickens entering the brooder may be accordingly controlled.

Disposed on opposite sides of the uprights 20 are inclined fingers or rests 27 arranged to bear against the projections 26 on the pawls and normally support said pawls in elevated position so that the projections 26 are out of contact with the teeth on the adjacent ratchet wheel. These pawls 24 and 25 are of such a length that when either pawl is actuated the free end thereof will rest on the extended end of the mating crank arm 17, thereby to prevent the projection 26 from binding or wedging on the teeth of the ratchet wheels when the platforms are depressed. It will thus be seen that when the machine is idle both pawls will be held out of engagement with the ratchet wheels by means of the fingers or rests 27 so that the shaft 21 is free to rotate or oscillate in either direction.

In order to maintain the teeth on the ratchet wheel in proper relation to the pawls there is provided a wheel or disk 28 the periphery of which is provided with a series of depressions or scallops, preferably fifteen in number, and which receive the curved terminal 29 of a leaf spring 30. The tension of the spring 30 is such as normally to prevent oscillation or rotation of the shaft 21 and its associated parts in either direction but is easily released from said disk when either platform is operated by the weight of a chicken.

Interposed between the scalloped wheel or shaft centering device 28 and the ratchet wheel 23 is a wheel or disk 31 having a peripheral tooth or projection 32 arranged to alternately engage a pair of spaced fingers 33 and 34 mounted on an auxiliary shaft 35, thereby to effect the opening and closing of the gate or barrier 36. Disposed at the juncture of the fingers 33 and 34 are angularly disposed arms 37 and 38 to one of which is secured the gate or barrier 36, while the other arm 38 is provided with a counter weight or balance 39.

Extending laterally from the partition 6 are stop pins 40 and 41, the stop pin 40 being disposed in the path of movement of the arm 37 and arranged to limit the closing movement of the gate 36, while the stop pin 41 serves to receive the impact of the arm 38 when the gate is moved to open position.

The case or receptacle 5 is provided with a removable cover arranged to fit over and house the actuating mechanism, said cover being secured in position on the base of the receptacle by means of suitable hooks 42 pivotally mounted on the side walls of the cover and arranged to engage pins or lugs 43 extending laterally from said base, as best shown in Fig. 1 of the drawings.

Depending from the opposite ends of the casing or receptacle 5 at the elevated ends of the platforms 13 and 14 are transparent plates 44 which form partial closures for the compartments or passages 7 and 8 and serve to prevent the chickens from entering the receptacle and actuating the device by alighting on the high or elevated ends of said platforms.

The operation of the device is as follows:—In Figs. 1 and 6 of the drawings the gate or barrier 36 has just been closed by the continued operation of the pivoted platform 13 and is kept in closed position by resting upon the projection or stud 40. No chickens can pass through the passage 7 until one or more have passed out through the passage 8. The first chicken which passes out through the passage 8 will depress the platform 14 and cause the disk 22 to engage the finger 33 and move the gate to open position with the arm 38 resting against the lug or projection 41. Any number of chickens may now pass from the brooder to the barn-yard or inclosure up to the limit of the number of ratchet teeth on the wheels 22 and 23, which, in the drawings, is fifteen. While the compartment in the brooder is not full, it is evident that chicks may pass in or out at will as the door will remain open until the entrance limit is again reached. If a less number of chickens than fifteen are desired in the compartment of the brooder, the tooth or projection 32 is placed at such a position on the shaft 21 that it engages and actuates the fingers 33 and 34 when the desired number of chicks have been admitted. In order to lock the wheel 28 at different positions of adjustment on the shaft 21 the ratchet wheel 23 is provided with an opening 44' adapted to register with any number of a series of openings 45 in the wheel 28 so that a pin may be inserted therein. If it is desired, however, any other suitable means may be employed for locking the wheel 28 on the shaft 21 so as to change the position of the tooth or projection 32 and thus control the number of chickens entering the brooder.

In Figs. 8 and 9 of the drawings there is illustrated a modified form of the invention in which the wheel or disk 31 is dispensed with and a gear wheel 46 rigidly secured to the shaft 21'. Extending transversely across the case or receptacle forming the body of the brooder are spaced guides 47 and 48, between which is slidably mounted a rack bar 49, the teeth of which mesh with the teeth of a gear wheel 46, there being guide lugs or trunnions 50 extending laterally from the rack bar 49 and operating in slots or channels 51 in the guides 47 and 48, as best shown in Fig. 10 of the drawing. Slidably mounted in the rack bar 49 is a movable member or block 53 having a rack on the upper face thereof meshing with a pinion 54 carried by a shaft 55. The shaft 55 is provided with oppositely disposed crank arms 56 to the end of each of which is secured a gate or closure 57, these gates being arranged to alternately close the entrance and exit passages of the separator at predetermined intervals. The rack bar 49 is formed with a series of perforations 58 arranged to receive suitable pins 59, the latter being adapted to engage the sliding member or block 53 to actuate the latter to alternately close the doors. In the operation of this form of the device the ratchet wheel 23' will be rotated until fifteen chickens have entered the brooder, in which event the gear 46 will have actuated the rack bar 49 so as to cause the adjacent pin 59 to bear against the movable member or block 53 and shift the latter longitudinally of the rack bar 49, thereby to rotate the pinion and move one of the doors 57 to closed position, thus preventing any more chickens from entering the brooder. When one of the doors 57 is moved to closed position, the opposite door will be moved to open position so that fifteen chickens may leave the brooder and pass to the barn-yard or other inclosure. After fifteen chickens have left the brooder the pin 59 at the opposite end of the rack 47 will bear against the movable member 53 and again actuate the pinion 54 to close one door and open the other.

While the invention is especially designed for forming an entrance and exit to a chicken brooder or colony house it will of course be understood that the same may be used in connection with the other stock houses or pens where it is desirable to keep stock separated into small groups so as to avoid crowding and consequent suffocation.

From the foregoing description it is thought that the construction and operation of the device will be readily understood by those skilled in the art and further description thereof is deemed unnecessary.

Having thus described the invention what is claimed is:—

1. A poultry separator including a receptacle having an entrance passage and an exit, spaced ratchet wheels mounted for rotation within the receptacle, a gate forming a closure for the entrance passage, a gate actuating member, operating after a predetermined amount of travel of the ratchet wheels, pivoted platforms disposed within the receptacle, and pawls carried by the pivoted platforms and arranged to engage the teeth of the ratchet wheels, whereby a step-by-step movement is given the ratchet wheels when the platforms are tilted.

2. A poultry separator including a receptacle having an entrance passage and an exit, spaced ratchet wheels mounted for rotation within the receptacle, a gate forming a closure for the entrance passage, a gate actuating member secured to and mounted for rotation with the ratchet wheels, operating after a predetermined amount of travel of the ratchet wheels, pivoted platforms arranged within the receptacle, and pawls carried by the pivoted platforms and arranged to engage the teeth on the ratchet wheels whereby a step by step movement is given to the ratchet wheels when the platforms are tilted.

3. A poultry separator including a receptacle having an entrance passage and an exit, spaced ratchet wheels mounted for rotation within the receptacle, a gate forming a barrier for the entrance and provided with spaced fingers, a disk mounted for rotation with the ratchet wheels and provided with a lug arranged to alternately engage the fingers for moving the gate to open and closed positions, pivoted platforms, and pawls carried by the platforms and arranged to engage and rotate the ratchet wheels.

4. A poultry separator including a receptacle having an entrance passage and an exit, spaced ratchet wheels mounted for rotation in said receptacle, a gate operatively connected with said ratchet wheels, pivoted platforms disposed within the entrance passage and exit and provided with angularly disposed arms, and pawls pivotally mounted on said arms and arranged to engage the teeth on the ratchet wheels for effecting the opening and closing movement of the gate.

5. A poultry separator including a receptacle having an entrance passage and an exit, a rotating member, a gate forming a closure for one of said passages, means carried by the rotating member for moving the gate to open and closed positions at predetermined intervals, depressible members disposed within the entrance and exit passages, and means carried by said depressible members and arranged to engage and actuate the rotating member to effect the opening or closing movement of the gate.

6. A poultry separator including a receptacle having an entrance passage and an exit, a rotating member, a gate forming a closure for one of said passages, a gate actuating member carried by the rotating member, pivoted platforms, and means carried by said platforms and arranged to engage and rotate said rotating member with a step by step movement to effect the opening and closing of the gate at predetermined intervals.

7. A poultry separator including a receptacle having an entrance passage and an exit, a rotating member journaled in said receptacle, a gate forming a barrier for one of said passages, a gate actuating member movable with the rotating member, means for normally and yieldably supporting the rotating member against rotation, and depressible means disposed within the entrance and exit passages and operatively connected with the rotating member for actuating the latter to open and close the gate at predetermined intervals.

8. A poultry separator including a receptacle having an entrance passage and an exit, spaced ratchet wheels mounted for rotation in the receptacle and having oppositely disposed teeth, a gate forming a closure for one of said passages and provided with an arm having spaced fingers, a gate actuating member interposed between the ratchet wheels and provided with a projection arranged to alternately engage the fingers for moving the gate to open and closed positions at predetermined intervals, depressible platforms, and pawls pivotally mounted on said platforms and arranged to engage the teeth on the ratchet wheels for rotating the latter.

9. A poultry separator including a receptacle having an entrance passage and an exit, uprights disposed within the receptacle, a main shaft journaled in said uprights, ratchet wheels secured to the shaft and having oppositely disposed teeth, an auxiliary shaft, angularly disposed arms secured to the auxiliary shaft, a door carried by one of said arms, spaced fingers disposed at the juncture of said arms, a gate actuating member secured to the shaft between the ratchet wheels and provided with a projection arranged to engage the fingers for moving the gate to open and close positions, pivoted platforms disposed within the passage ways, and pawls operatively connected with the pivoted platforms and arranged to engage the teeth on the ratchet wheels for rotating the latter.

10. A poultry separator including a receptacle having an entrance passage and an exit, a shaft journaled within the casing, spaced ratchet wheels secured to the shaft and provided with oppositely inclined teeth, a gate forming a barrier for one of said passages, a gate actuating member carried by the shaft, depressible platforms disposed within said passage ways and provided with laterally extending crank arms, pawls pivotally mounted on the crank arms and arranged to engage the teeth on the ratchet wheels for rotating the latter to effect the opening or closing of the gate, and means for normally supporting the pawls out of engagement with the ratchet teeth.

11. A poultry separator including a receptacle having an entrance passage and an exit, a shaft journaled in the receptacle, spaced ratchet wheels secured to the shaft and having their teeth inclined in opposite directions, a gate forming a barrier for one of said passages, a gate actuating member secured to the shaft, depressible platforms disposed within said passage-ways and provided with laterally extending arms, pawls pivotally mounted in said arms and arranged to engage the teeth on the ratchet wheels for effecting the opening or closing movement of the gate, a scalloped wheel interposed between one of the ratchet wheels and the gate actuating member, and a spring normally engaging the scalloped periphery of said wheel.

12. A poultry separator including a receptacle having an entrance passage and an exit, spaced ratchet wheels mounted for rotation within the receptacle, a gate forming a closure for one of said passages, means mounted for rotation with the ratchet wheels and operatively connected with the gate for moving the latter to open and closed positions, pivoted platforms arranged within the passageway and each having one end of its pivot extended laterally to form a crank arm, pawls pivotally mounted on said crank arms and provided with projections arranged to engage the teeth on the adjacent ratchet wheel, means for retarding the rotary movement of the ratchet wheels, and means for normally supporting the pawls out of engagement with the teeth on said ratchet wheels.

13. A poultry separator including a receptacle having an entrance passage and an exit, spaced ratchet wheels mounted for rotation in said receptacle, a gate forming a barrier for one of said passages, a gate actuating member mounted for rotation with the ratchet wheel, pivoted platforms, pawls arranged to engage the adjacent ratchet wheels, means for normally supporting the pawls out of engagement with the ratchet wheels, and means for moving said pawls into engagement with the adjacent ratchet wheels when the platforms are depressed.

14. A poultry separator including an entrance passage and an exit, inclined approaches disposed in said passages, spaced uprights, a main shaft journaled in the uprights, an auxiliary shaft disposed above the main shaft, angularly disposed arms secured to the auxiliary shaft, a gate depending from one of the arms and forming a closure for the entrance passage, ratchet wheels secured to the main shaft, fingers disposed at the juncture of the angularly disposed arms, a gate actuating member secured to the main shaft and provided with a projection arranged to engage the fingers for moving the gate to open and closed positions, pivoted platforms forming a continuation of the inclined approaches and having their pivots extended laterally to form crank arms, pawls pivotally mounted on said crank arms and arranged to engage the ratchet teeth, and means for normally supporting said pawls out of engagement with the ratchet wheels.

15. A poultry separator including a receptacle having a detachable cover and provided with a partition forming an entrance passage and an exit, a depressible platform mounted for pivotal movement in each passage-way, spaced ratchet wheels mounted for rotation between the pivoted platforms, a gate forming a closure for one of said passage-ways, a gate actuating member movable with said ratchet wheels, an inclined approach leading to each platform, crank arms extending laterally from said platforms, pawls pivotally mounted on said crank arms and arranged to alternately engage the adjacent ratchet wheels, and means for normally supporting the pawls out of engagement with said ratchet wheels.

16. A poultry separator including a receptacle having an entrance passage and an exit, a tilting platform in the entrance passage, a closure for the entrance, and means operatively connected to the closure and the platform for actuating the closure after the platform has been tilted a predetermined number of times.

17. A poultry separator including a receptacle having an entrance passage and an exit, a tilting platform in the entrance passage, a gate forming a closure for the entrance, and a rotatable member operatively connected to the gate and the platform, and actuating the gate after the platform has been tilted a predetermined number of times.

In testimony that I claim the foregoing as my own, I have hereto affixed my signature in the presence of two witnesses.

EARL HILL.

Witnesses:
 PLINY TRUMBO,
 LYDIA TRUMBO.